United States Patent
Gariboldi et al.

(10) Patent No.: US 6,518,830 B2
(45) Date of Patent: Feb. 11, 2003

(54) HIGH EFFICIENCY ELECTRONIC CIRCUIT FOR GENERATING AND REGULATING A SUPPLY VOLTAGE

(75) Inventors: Roberto Gariboldi, Lachiarella (IT); Riccardo Lavorerio, Broni (IT); Leonardo Sala, Pont S. Martin (IT); Giovanni Nidasio, Rosate (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/935,056

(22) Filed: Aug. 21, 2001

(65) Prior Publication Data

US 2002/0070794 A1 Jun. 13, 2002

(30) Foreign Application Priority Data

Aug. 22, 2000 (EP) .............................................. 00830586

(51) Int. Cl.[7] ................................................. G05F 1/10
(52) U.S. Cl. ...................................... 327/536; 327/143
(58) Field of Search ................................. 327/142, 143, 327/530, 534, 535, 536, 537, 538, 540

(56) References Cited

U.S. PATENT DOCUMENTS

| | | | |
|---|---|---|---|
| 5,444,412 A | 8/1995 | Kowalski | 327/541 |
| 5,640,118 A | 6/1997 | Drouot | 327/306 |
| 5,796,285 A | 8/1998 | Drouot | 327/306 |
| 5,946,258 A * | 8/1999 | Evertt et al. | 327/536 |
| 6,229,385 B1 * | 5/2001 | Bell et al. | 327/536 |
| 6,429,725 B1 * | 8/2002 | Tanzawa et al. | 327/536 |

* cited by examiner

Primary Examiner—Jeffrey Zweizig
(74) Attorney, Agent, or Firm—Lisa K. Jorgenson; Harold H. Bennett, II; Seed IP Law Group PLLC

(57) ABSTRACT

A high-efficiency electronic circuit generates and regulates a supply voltage and includes a charge-pump voltage multiplier which is associated with an oscillator and has an output connected to a voltage regulator in order to ultimately output said supply voltage. Advantageously, the circuit comprises a first hysteresis comparator having as inputs the regulator output and the multiplier output, and comprises a second hysteresis comparator having as inputs a reference potential and a partition of the voltage presented on the regulator output. The comparators are structurally and functionally independent of each other, and their outputs are coupled to the oscillator through a logic circuit to modulate the oscillator operation.

21 Claims, 10 Drawing Sheets

HIGH EFFICIENCY ELECTRONIC CIRCUIT FOR GENERATING AND REGULATING A SUPPLY VOLTAGE

BACKGROUND OF THE INVENTION

1. Field of the Invention

This invention relates to a high-efficiency electronic circuit for generating and regulating a supply voltage.

More particularly, the invention relates to a circuit as above, comprising a charge-pump voltage multiplier which is associated with an oscillator and has an output connected to a voltage regulator in order to provide said supply voltage on its output.

Particularly but not exclusively, this invention relates to a DC_low_V-DC_high_V voltage converter, as well as to an associated regulating circuit portion which automatically optimizes the converter efficiency according to the applied current load. The description that follows is made with reference to this application field for description simplicity.

2. Description of the Related Art

Nowadays an ever more pressing demand exists in this particular technical field for devices which can be powered at a very low voltage (1 or 2 Volts, for example) from a battery supply in portable apparatus.

This demand clashes with the need to have higher internal voltages (upward of 10 Volts, for example) than the supply voltage available in electronic circuits, for supplying circuit portions which can properly operate only on a higher voltage. Quite often this need is filled by using voltage-multiplying circuits, or charge-pump boosters, which are able to produce a higher voltage than the supply voltage across a charge capacitor In this context, it is particularly important to have the possibility to regulate and program the supply voltage, on which the boosted voltage is also dependent.

Furthermore, the need of reducing power consumption as much as possible, to extend the battery life, leads to the efficiency optimization of the voltage multiplier, and more generally of all the DC_low_V and DC-high-V conversion circuits. This efficiency is especially restrained by the use of integrated capacitances.

A common approach to generating a voltage higher than the supply voltage is schematically shown in FIG. 1. FIG. 1 is a block diagram of a charge-pump voltage multiplier circuit (x2, x3 or x4, for example) having an oscillator CLOCK associated therewith and an output VCHARGE which is beset with ripple at the scan frequency of the oscillator. A linear regulator connected downstream of the charge pump operates to smooth the signal VCHARGE and to output a virtually DC voltage Vout.

This prior solution provides no control loop on the oscillator CLOCK of the multiplier, and its scan frequency is constant, independently of the current load I_Load on the regulator output. As this current load is varied, top efficiency can only be achieved at maximum load (I_Load_max), while at minimum (I_Load min) or zero load, unnecessary power consumption is brought about by the booster being kept fully operational. It is on this account that the above described solution is only applicable where the load I_Load is constant.

Another prior approach is schematically shown in FIG. 2. A fraction of the output voltage from the charge pump is used to drive a hysteresis comparator which turns on/off the oscillator CLOCK associated with the multiplier. Thus, according to the magnitude of the load I_load, the oscillator is set on or off to provide optimum efficiency.

Since no voltage regulator is provided in this approach, the output voltage Vout exhibits a ripple—at the same frequency as the oscillator CLOCK—which is added to an oscillation due to the range (drop_min; drop_max) defined by the comparator hysteresis.

The last-mentioned approach is more effective than the former, but a systematic ripple appears at the output Vout which is unacceptable in some applications, such as supplying an LCD driver. In this application the output voltage Vout must be programmed at different levels in steps of about 30mV.

SUMMARY OF THE INVENTION

An embodiment of this invention provides an electronic circuit for generating and regulating a supply voltage, which has such structural and functional features such to produce high boost efficiency and reasonable ripple in the voltage generated, thereby overcoming the drawbacks and limitations of the prior art.

The electronic circuit uses a pair of structurally and functionally independent hysteresis comparators which act on the oscillator of the voltage multiplier according to the values attained by the supply voltage produced out of the regulator, or attained by the voltage produced by the multiplier output.

According to one embodiment of the invention, an electronic circuit for generating and regulating a supply voltage is provided. The circuit includes a voltage multiplier that is associated with an oscillator, a voltage regulator having an input connected to the output of the voltage multiplier, a first hysteresis comparator having as inputs the regulator output and the multiplier output, and a second hysteresis comparator having as inputs a reference potential and a partition of the voltage presented on the regulator output, the outputs of both comparators being coupled to said oscillator.

The first comparator controls the circuit during normal operation. This comparator is configured to turn on the oscillator if the output of the multiplier does not exceed the output of the regulator by more a first margin, and to turn off the oscillator if the output of the multiplier exceeds the output of the regulator by more than a second margin.

The second oscillator controls the circuit during start-up, and holds the oscillator on until the output of the regulator reaches a programmed operating level. during this period the first comparator is disabled.

The invention also relates to a method of operation of the circuit, according to an embodiment of the invention..

BRIEF DESCRIPTION OF THE DRAWINGS

The features and advantages of the circuit and the method according to the invention will be apparent from the following description of embodiments thereof, given by way of non-limitative examples with reference to the accompanying drawings.

In the drawings.

DETAILED DESCRIPTION OF THE INVENTION

Figure 3:
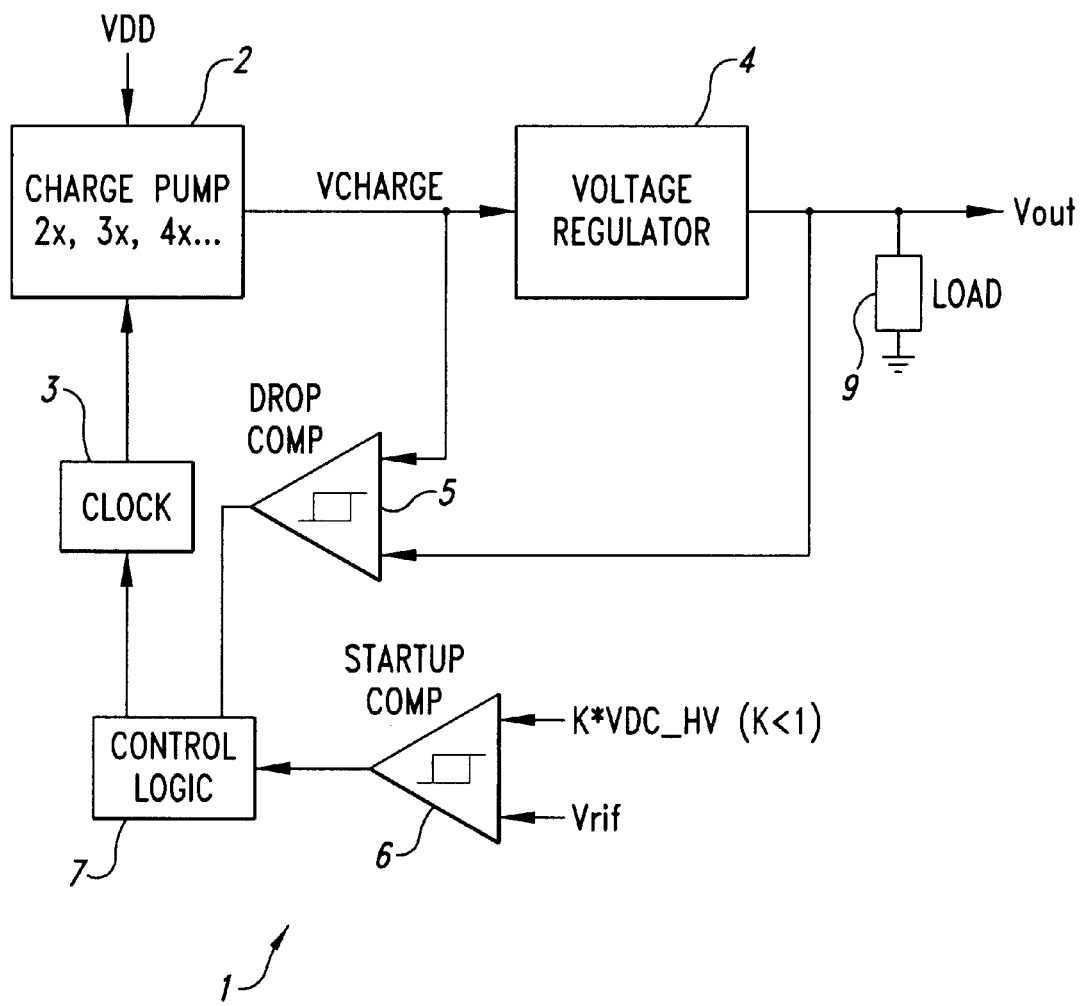
FIG. 3 shows a block diagram view of an electronic circuit produced according to the present invention.

With reference to the above figures, in particular to FIG. 3, an integrated electronic circuit according to this invention, for generating and regulating a supply voltage, is generally and schematically shown at 1. This device may also be referred to as a power supply, or a high voltage circuit.

Hereinafter, the supply voltage 8 will be designated Vout to signify that it represents the output voltage from the circuit 1, independently of how used.

Particularly but not exclusively, the circuit 1 is intended for use in a DC_low_V-DC_high_V voltage converter having a regulating circuit portion associated therewith which automatically optimizes its efficiency according to the applied current load 9.

The circuit 1 comprises a charge-pump voltage multiplier 2 associated with an oscillator 3. More particularly, the oscillator 3 is a controlled turn-off oscillator, as explained hereinafter.

The booster 2 is supplied by a voltage Vdd and has an output connected to a voltage regulator 4 in order to ultimately output said supply voltage Vout. Preferably, the regulator 4 is a linear voltage regulator.

Advantageously in this invention, the circuit 1 further comprises a hysteresis comparator 5 (DROP COMP) which has as inputs both the output of the linear regulator 4 and that of the multiplier 2.

Advantageously, a second hysteresis comparator 6 (STARTUP COMP) is also provided which has as inputs a reference voltage Vrif and a partition or fraction K of the voltage at the regulator 4 output. For example, the first input to the comparator 6 could be K*Vdc_hv, with K<1.

The respective outputs of the first 5 and second 6 comparators are connected to the same logic circuit 7 whose output acts on the oscillator 3 to turn it on or off.

The logic circuit 7 can be realized with either a single logic gate or a small network of logic gates.

The structure just described is intended for providing a DC_low_Voltage and DC_high_Voltage converter which can output a DC voltage in a highly efficient way representing an optimum for any possible load situations.

The operation of the inventive circuit will now be described, except for the second comparator 6, which only operates at the power-on stage.

Let assume the circuit 1 to be at steady state, with the second comparator 6 idle and the voltage Vout constant at its programmed value. The first comparator 5 operates when the difference of potential between the output of the charge-pump multiplier 2 and the voltage Vout decreases below a predetermined minimum level. Presently, the oscillator 3 associated with the multiplier is set on to enhance the difference of potential.

By converse, if the dropout or difference between VCHARGE and Vout exceeds a predetermined maximum level, the comparator 5 will cut off the oscillator 3 of the multiplier 4 to avoid unnecessary current consumption. More precisely, since a controlled turn-off oscillator 3 is used, when the first comparator 5 sends the cutoff signal to the oscillator 3, the latter retains its (high or low) state in that instant, and the oscillator 3 will later be switched only upon receiving a new appropriate signal from the comparator 5. Thus, the average frequency of the oscillator 3 is caused to vary according to the current draw from the load 9 connected to the circuit 1 output, thereby optimizing the efficiency of the whole circuit 1.

When the circuit 1 is switched on, the charge capacitance (s) of the multiplier 4 is(are) at a maximum, and the voltages VCHARGE and Vout will therefore be zero. At startup, the operation of the input stage of the first comparator 5 is unforeseeable because such comparator 5 is supplied by these two voltages.

For this reason, the second comparator 6 operates at power-on, up to the moment when the voltages Vout and VCHARGE attain acceptable levels for the comparator 5. The comparator 6 bypasses the comparator 5 and drives the oscillator 3 to its peak rate. After this transitional startup phase, the second comparator 6 will be disconnected, allowing the first comparator 5 to adjust the operation of the oscillator 3 according to the regulated voltage Vout and to the load 9.

Thus, the frequency of the oscillator 3 is set to ensure maximum load 9. If the load 9 decreases, the frequency decreases too, thereby ensuring the required load 9.

Listed herein below are some data regarding the comparative efficiencies of this embodiment of the invention and the first conventional circuit discussed in relation to FIG. 1.

General Conditions

VDD=2.7V;

Multiplication factor of the charge pump: 4

Output voltage Vout from from the linear regulator: 8V

Frequency of multiplier 3 of booster 2: 2MHz.

For the load 9, three cases are considered:

maximum load current: 200uA;

medium load current: 100uA;

minimum load current: 20uA.

Calling Vout the output voltage of the linear regulator; I_load the current delivered to the load 9; and I_Vdd the supply current consumption; efficiency η is given by:

$$\eta = (Vout * I\_load)/(VDD * I\_Vdd).$$

The capacitances of the charge pump of the multiplier 2 are poly-diffusion integrated capacitances having a parasitic capacitance equal to 45% of the nominal capacitance.

Figure 1:
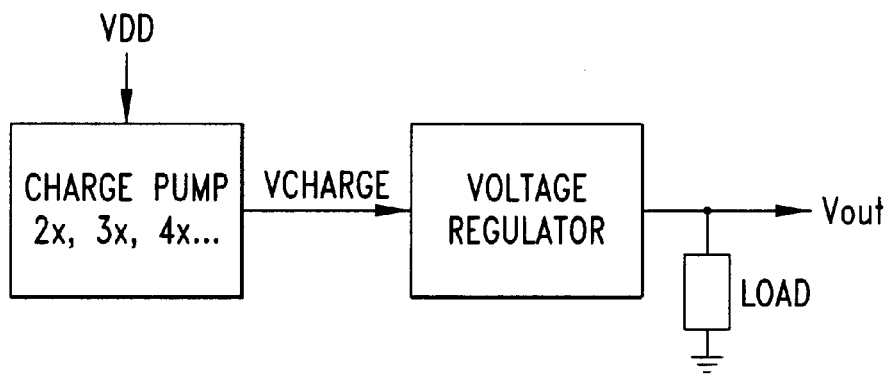
FIG. 1 shows a schematic view of a voltage multiplier associated with a voltage regulator produced according to the prior art.
Figure 2:
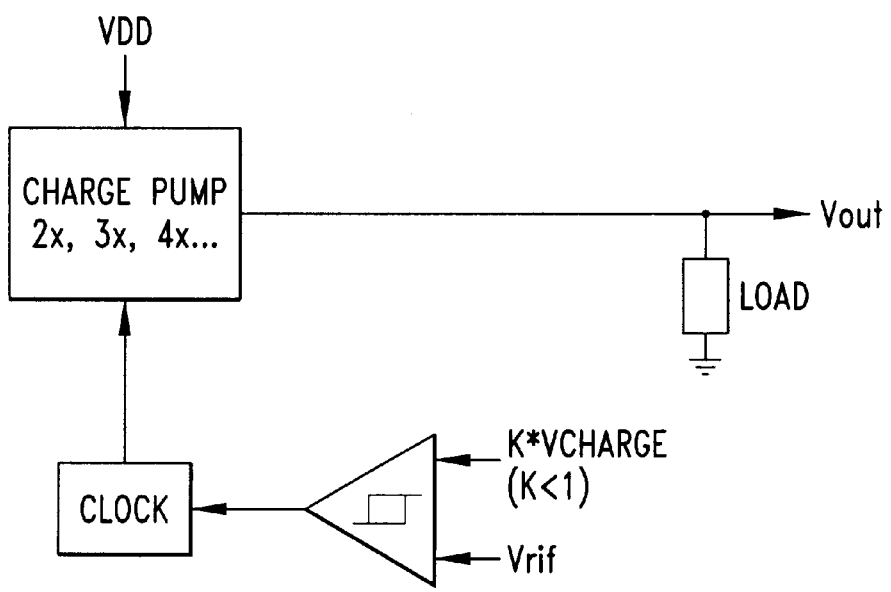
FIG. 2 shows a schematic view of a voltage multiplier associated with a voltage regulator produced according to the prior art.

With these conditions, the performances of the known type as illustrated in FIG. 1 are herein below specified.

Efficiency has been calculated for the three load current cases considered, and can be summarized as follows:

| | |
|---|---|
| Iload = 200 uA | η = 45%; |
| Iload = 100 uA | η = 32%; |
| Iload = 20 uA | η = 10%. |

Figure 4:
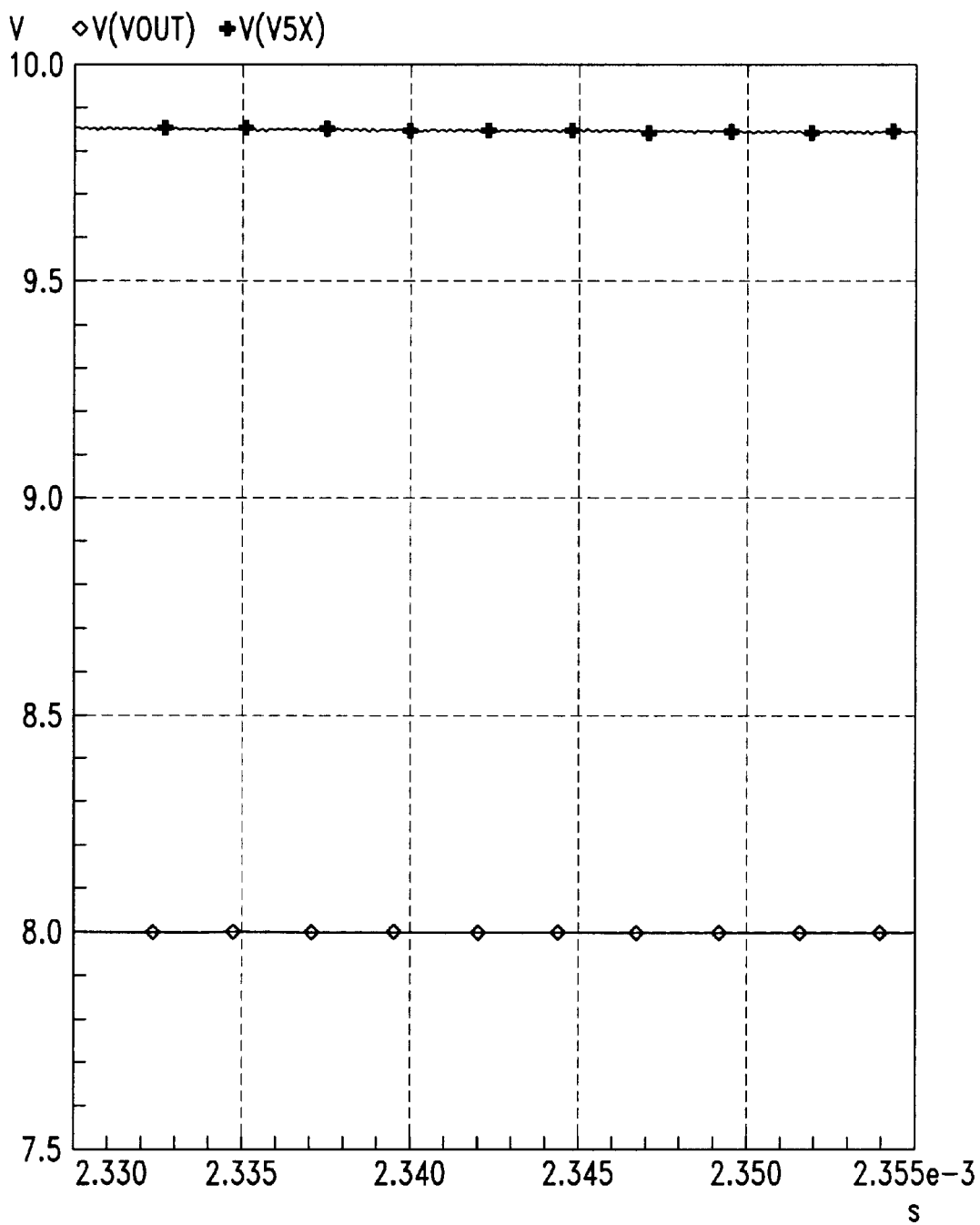
FIGS. 4, 5 and 6 are voltage vs. time diagrams showing the patterns of voltage values present in the voltage multiplier and in the regulator of FIG. 1.
Figure 5:
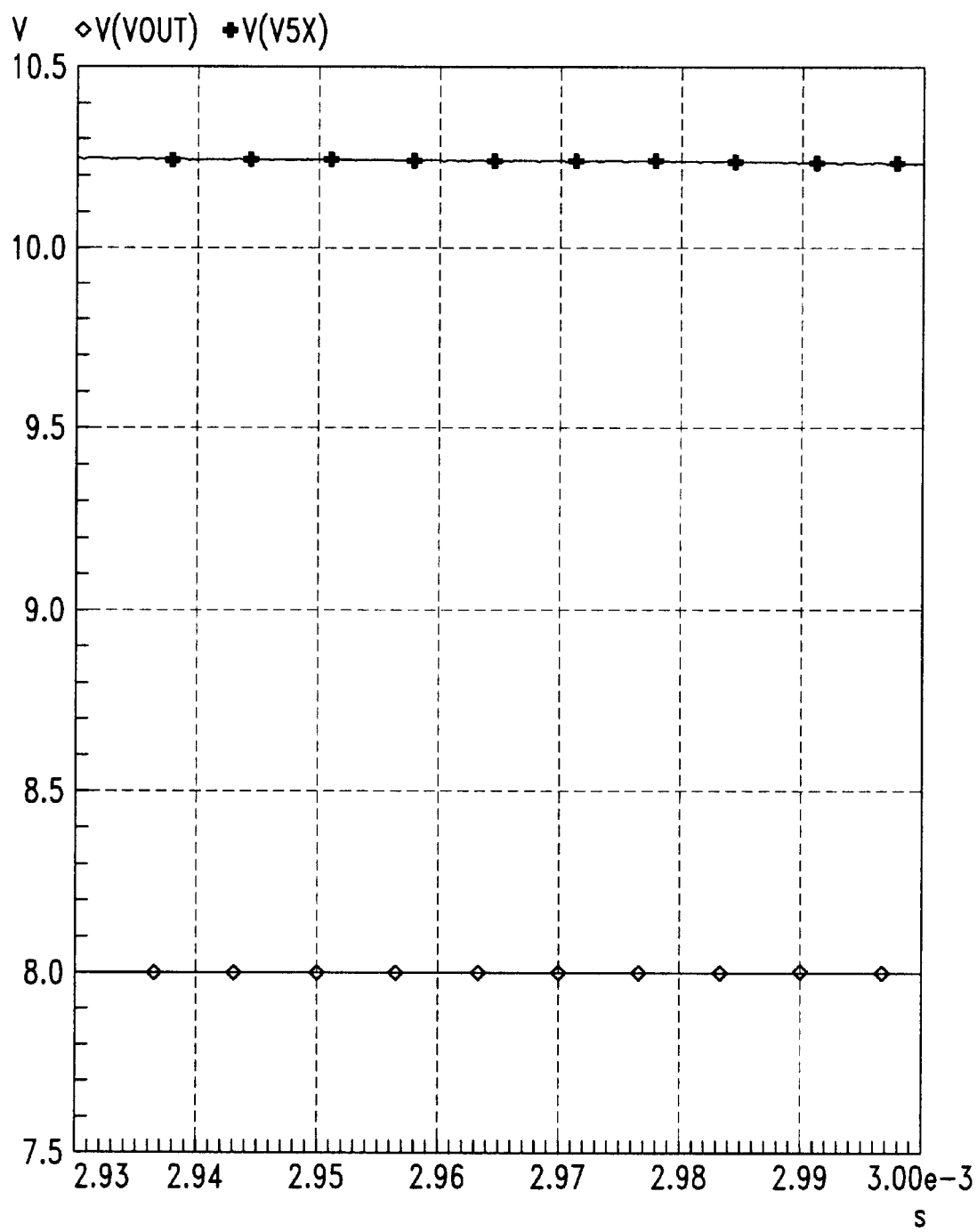
Figure 6:
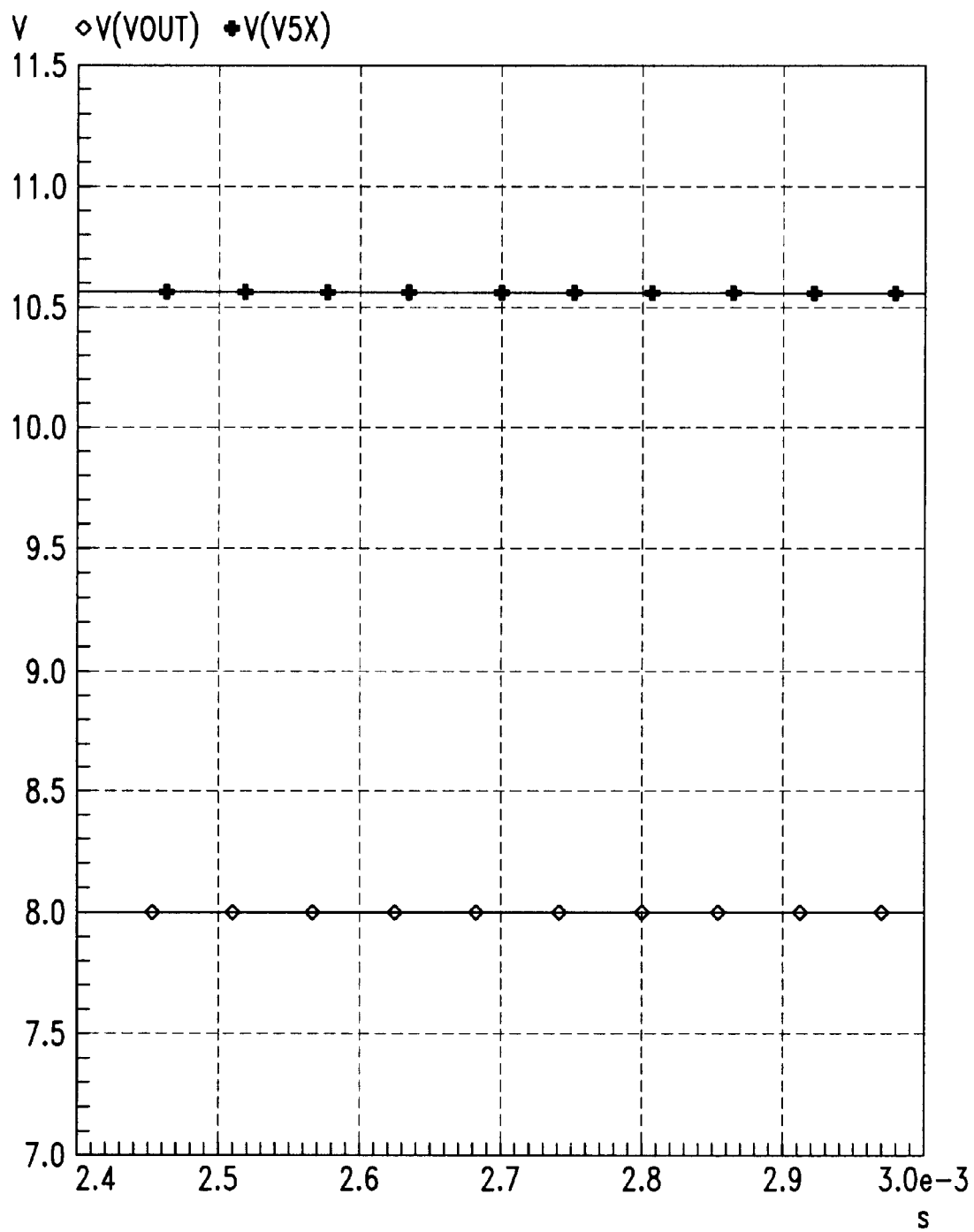

FIGS. 4, 5 and 6 show, on respective voltage vs. time diagrams, the output voltage values of the multiplier ("V5x") and the linear voltage regulator ("Vout") for the above mentioned three cases.

In the first case (Iload=200uA), the multiplier output steadies itself at about 9.85V, that is at a voltage which is already unnecessarily high relative to the regulator output (8V). This is due to the constant operation of the oscillator of the charge pump at the rated frequency (2Hz), so that the multiplier output reaches the highest allowed voltage depending on the load 9. This implies a higher consumption of the multiplier and more power dissipated by the regulator, which negatively reflects on the overall efficiency of the system.

As the load current decreases, the multiplier output further increases (10.25V at Iload=100uA, and 10.56 at Iload=20uA), causing the system efficiency to deteriorate appreciably.

With the same general conditions, the performances of the inventive circuit 1 are as specified herein below.

Efficiency has been calculated for the three load current cases considered, and can be summarized as follows:

| | |
|---|---|
| Iload = 200 uA | η = 58%; |
| Iload = 100 uA | η = 54%; |
| Iload = 20 uA | η = 40%. |

Figure 7:
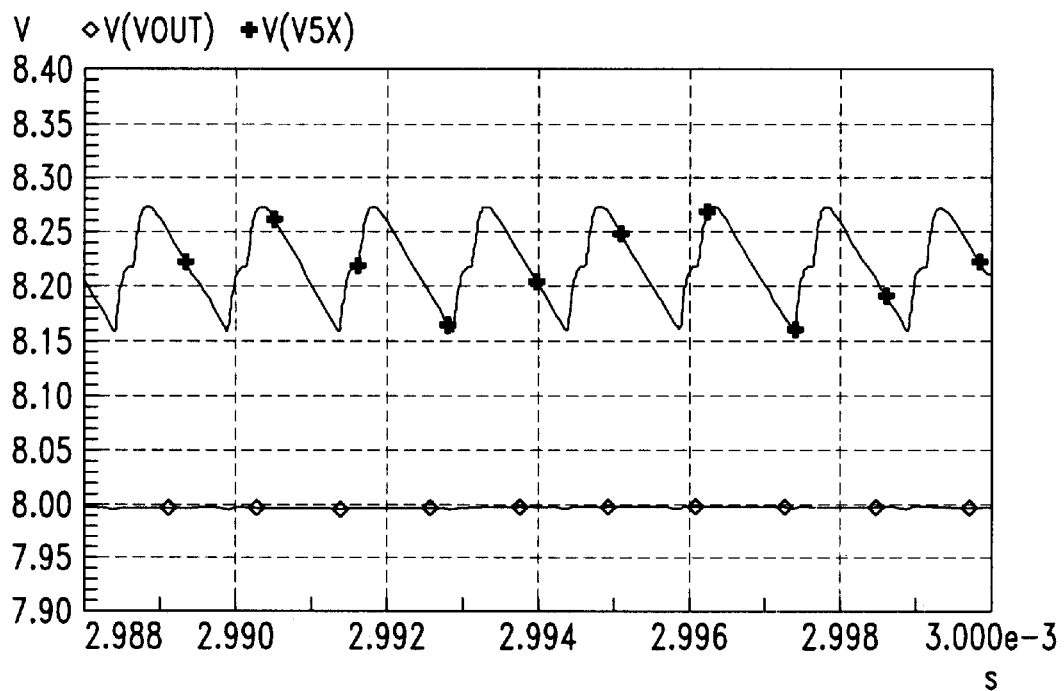
FIGS. 7, 8 and 9 are voltage vs. time diagrams showing the patterns of voltage values present in the inventive circuit of FIG. 3.
Figure 8:
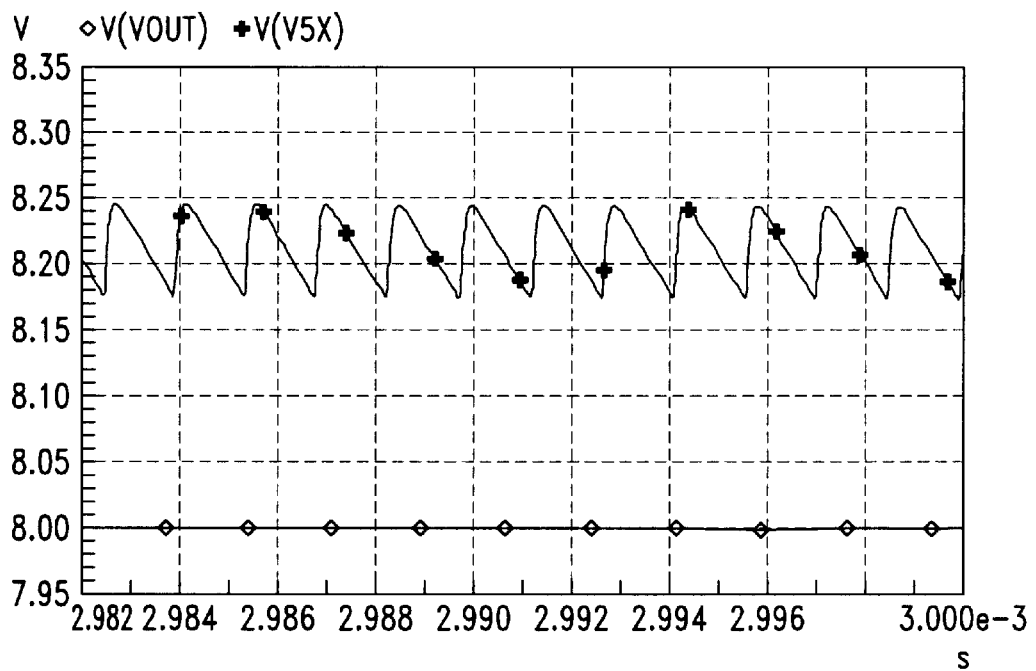
Figure 9:
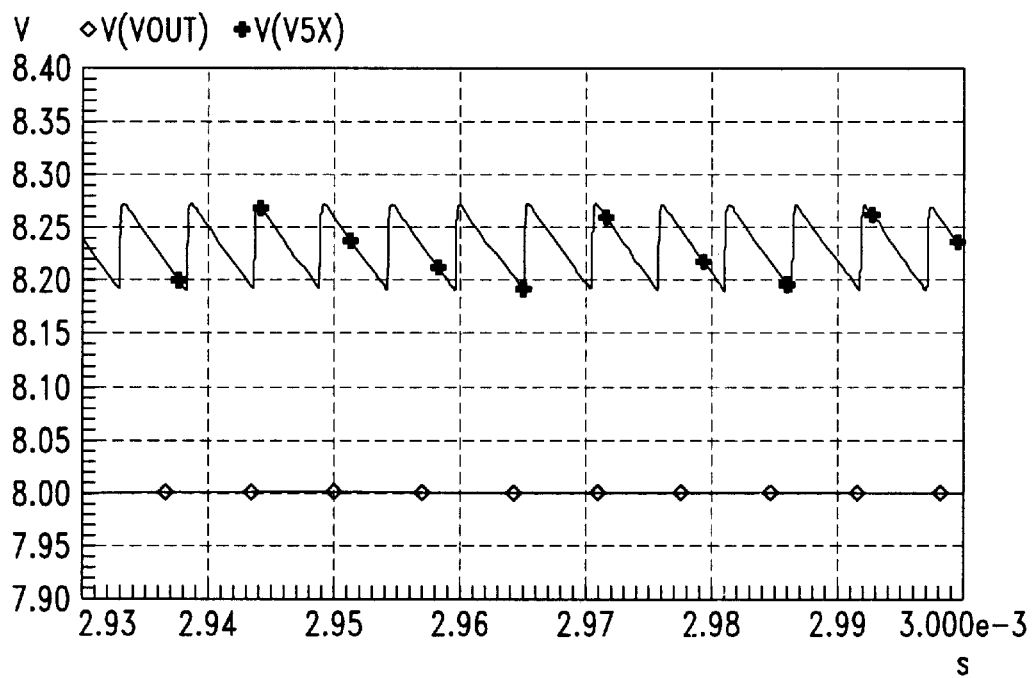

FIGS. 7, 8 and 9 show, on respective voltage vs. time diagrams, the output voltage values of the multiplier 2 ("V5x") and the linear voltage regulator 4 ("Vout") for the above mentioned three cases.

Figure 7A:
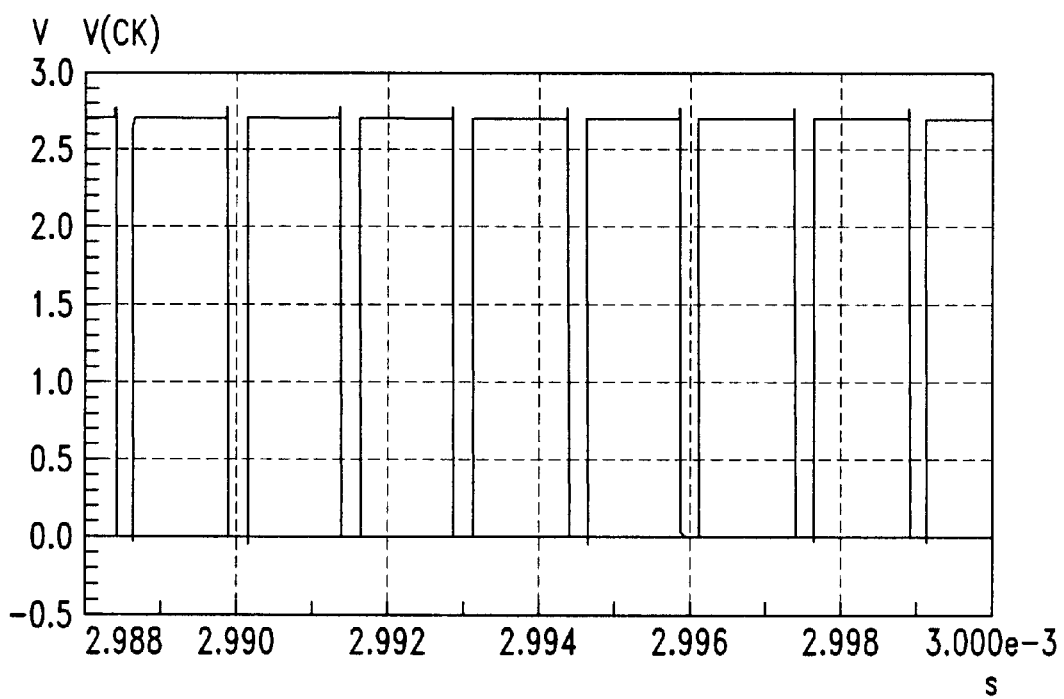
FIGS. 7A, 8A and 9A are voltage vs. time diagrams respectively showing the corresponding patterns of the output voltage of an oscillator provided in the inventive circuit of FIG. 3.
Figure 8A:
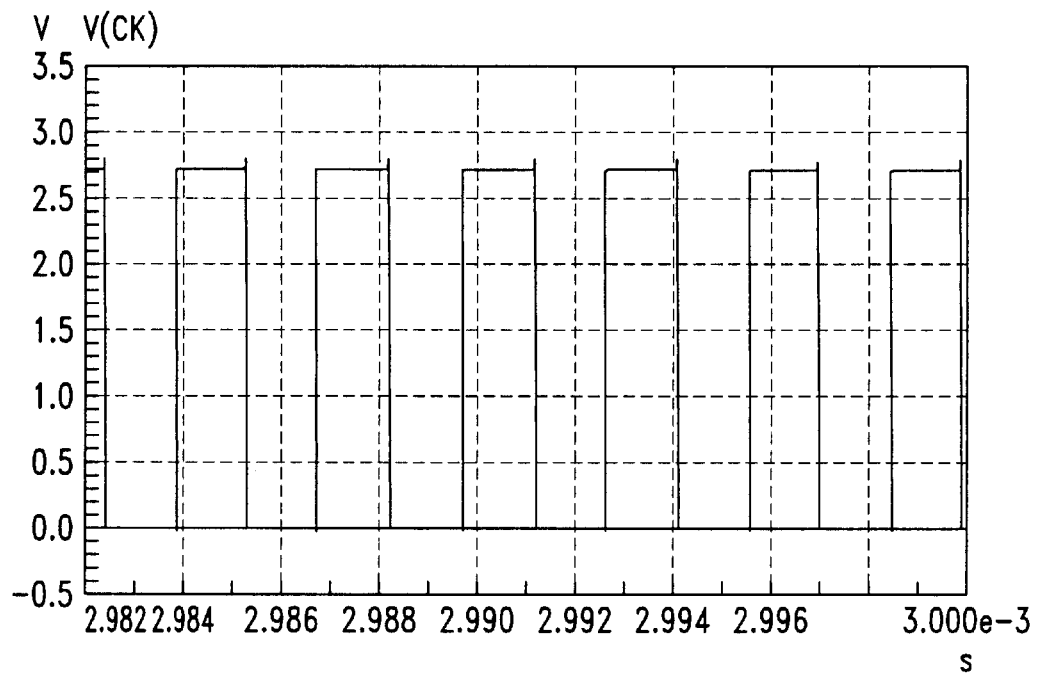
Figure 9A:
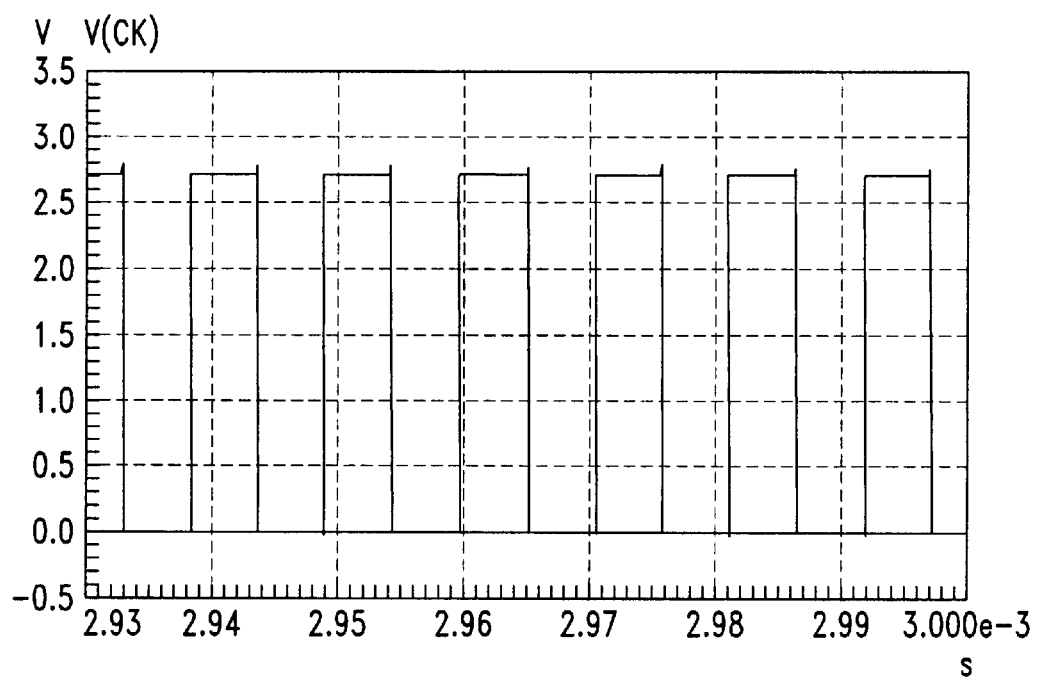

In FIGS. 7A, 8A and 9A the respective outputs of the oscillator 3 are shown for the above mentioned three cases.

The first comparator 5 chocks the oscillator of the multiplier 2 to hold its output VCHARGE somewhere between a minimum of about "+160mV" and a maximum of about "+300mV" relative to the regulator 4 output. It should be noted that both thresholds can be changed according to necessity. By varying the load I_load, the system automatically modulates the average frequency of the oscillator 3 (for example, 345kHz at Iload=100uA, and 94kHz at Iload=20uA), thereby holding the multiplier 2 output within the desired range and limiting the overall power consumption as well as the power dissipated by the regulator. Thus, the proposed system is much more efficient.

In essence, the circuit of this invention does solve the technical problem, and offers a number of advantages, foremost among which is that regulating efficiency is optimized under all load conditions.

Also, the system voltage maximum is always automatically kept under control, and is:

$Vmax=Vout+Vdrop$, which, in the instance of a fully integrated circuit implementation, is very useful to control the highest process voltage.

With large load currents, the hysteresis of the first comparator 5 can be adjusted to suit the load 9, e.g., as HYST=f(I_load), that is according to the load 9.

Figure 10:
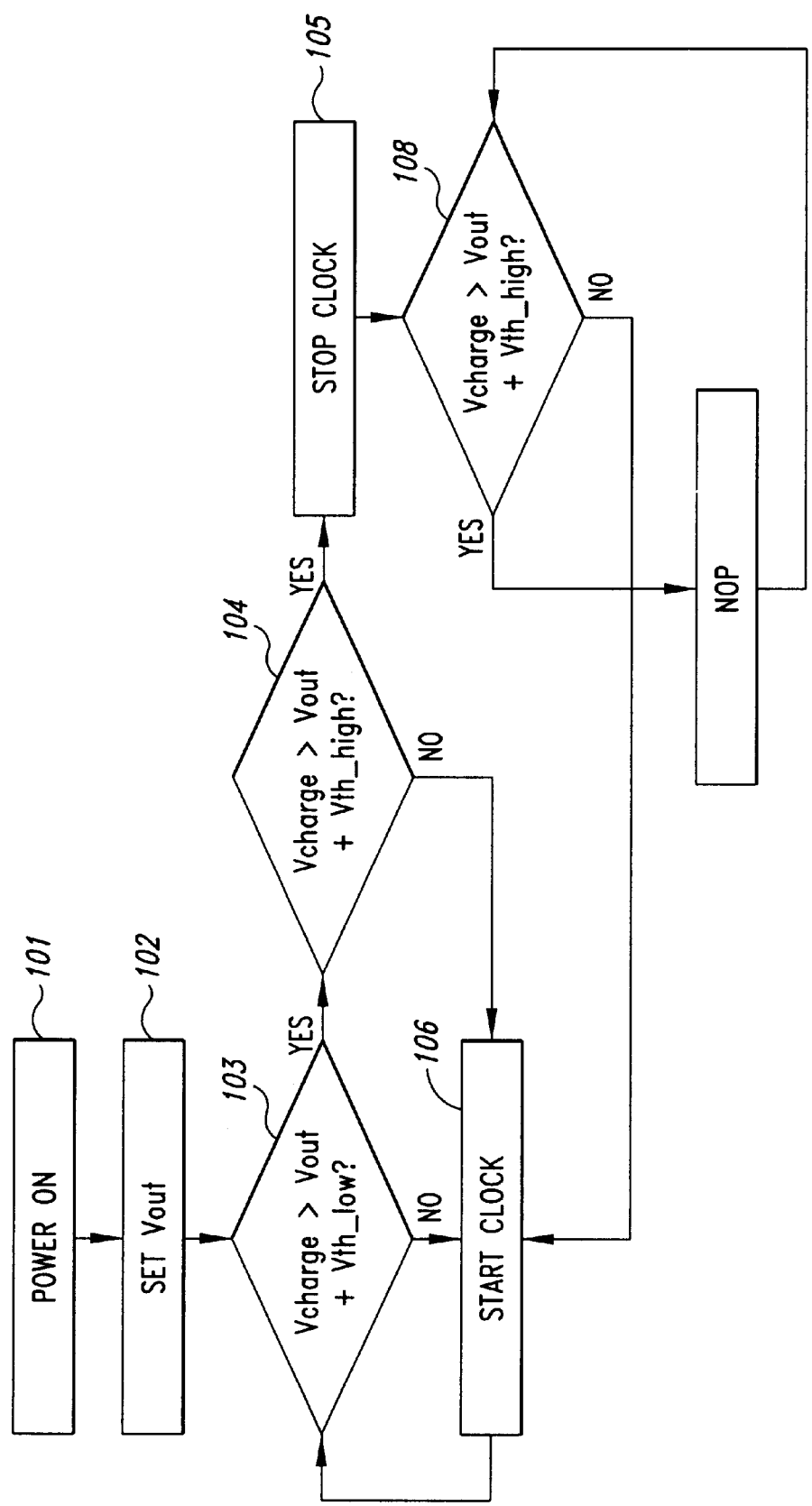
FIG. 10 shows a block diagram view illustrating the regulating method as applied by means of the inventive electronic circuit.

It will be appreciated from the foregoing that the circuit 1 of this invention permits implementation of a method of generating and regulating an output voltage Vout, as outlined herein below in relation to the block diagram of FIG. 10.

The circuit 1 is operated through an initial power-on step 101 and a step 102 of programming the output voltage Vout.

The power-on step 101 continues until the voltage Vout reaches a prearranged threshold (K*Vout), during which the oscillator 3 of the multiplier 2 remains on and cannot be cut off by the first comparator 5.

During this step 101, VCHARGE goes up with the oscillator 3 on, and as soon as this voltage, representing the supply to the regulator 4, becomes sufficient to operate the regulator 4, the voltage Vout will also begin to rise. However, in this condition the regulator 4 dropout remains uncontrolled.

After the power-on step 101 and the programming step 102, the hysteresis comparator 5 controls the oscillator 3 of the multiplier 2 turning on (Vcharge<Vout+Vth-low) or off (Vcharge>Vout+Vth-high).

During the remaining steps, the dropout of the regulator 4 is controlled by the comparator 5 and held within range (Vth-low, Vth-high).

In step 103, VCHARGE is compared with Vout. If VCHARGE does not exceed Vout by more than Vth-low, step 106 follows, in which the oscillator clock is started. If VCHARGE does exceed Vout by more than Vth-low (step 103) but does not exceed Vout by more than Vth-high (step 104), then step 106 again follows, in which the clock is started, or is permitted to continue in operation. Step 103 then follows step 106 and the process is repeated.

If, in step 104, VCHARGE exceeds Vout by more than Vth-high, step 105 follows, in which the clock is stopped, and step 108 then proceeds.

In step 108, VCHARGE is again compared to Vout. No action is taken until VCHARGE does not exceed Vout by more than Vth-low, at which time the clock is again started (step 106). Thus, while the regulator 4 drives and then holds its output Vout at the programmed value, the supply voltage VCHARGE to the regulator 4 is held within range (Vout+Vth-low, Vout+Vth-high). A minimum dropout for proper operation of the regulator can therefore be ensured, while keeping the maximum dropout controlled for optimizing the system efficiency.

Figure 11:
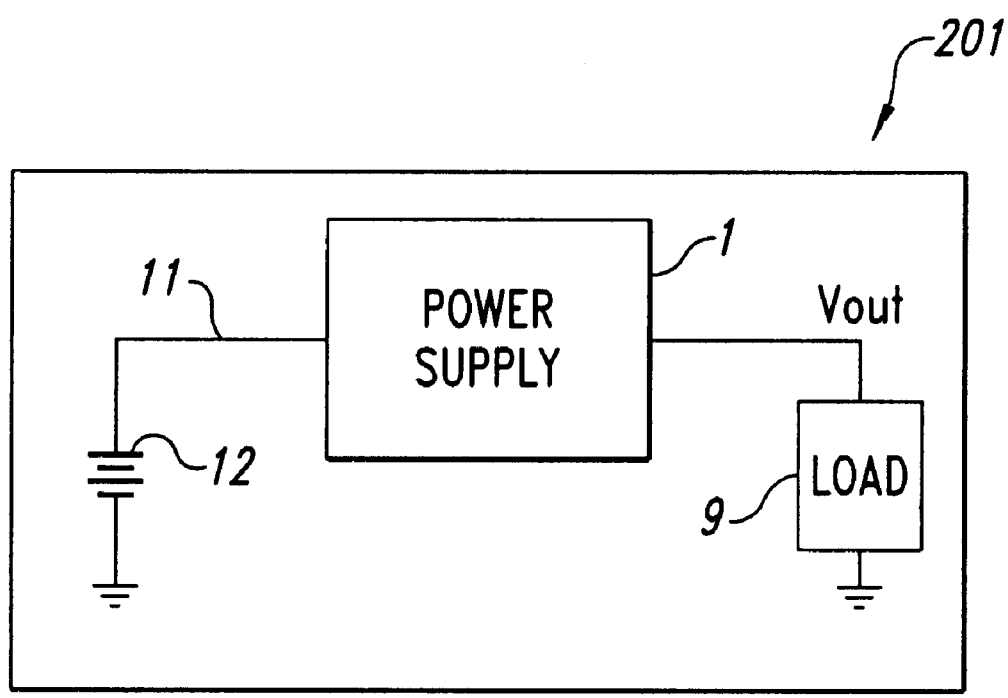
FIG. 11 shows a block diagram of a device that employs an electronic circuit according to an embodiment of the invention.

FIG. 11 illustrates an embodiment of the invention in which a battery-powered device 201 is powered at a relatively low voltage by a battery 12. The block designated 1 in FIG. 11 is an integrated electronic circuit or power supply for generating and regulating a supply voltage, higher than the voltage provided by the battery 11, and is shown in more detail in FIG. 3. Vout is the regulated high voltage supply for the load 9.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A high-efficiency electronic circuit for generating and regulating a supply voltage, comprising:
   a charge-pump voltage multiplier which is associated with an oscillator and has an output;
   a voltage regulator, having an input connected to the output of the charge pump voltage multiplier, and an output for outputting said supply voltage;
   a first hysteresis comparator having as inputs the regulator output and the multiplier output; and a second hysteresis comparator having as inputs a reference potential and a partition of the supply voltage presented on the regulator output, the outputs of both comparators being coupled to said oscillator.

2. An electronic circuit according to claim 1, wherein said comparators are structurally and functionally independent of each other.

3. An electronic circuit according to claim 1, wherein said oscillator is a controlled turn-off oscillator.

4. An electronic circuit according to claim 1, wherein the second comparator operates at a power-on of the circuit, during which the first comparator is cut off.

5. An electronic circuit according to claim 1, wherein the outputs of the comparators are coupled to the oscillator through a logic circuit.

6. An electronic circuit according to claim 5, wherein said logic circuit is either a logic gate or a logic network.

7. An electronic circuit according to claim 1 wherein the hysteresis of the first comparator can be regulated according to the electric load connected to the circuit output.

8. An electronic circuit according to claim 1, further including a DC voltage source coupled to supply a DC voltage to the charge pump voltage multiplier.

9. An electronic circuit according to claim 1, wherein said partition of the supply voltage is a <1 fraction of said supply voltage.

10. A method of high-efficiency regulation of an output voltage of an electronic circuit which includes a charge-pump voltage multiplier being associated with an oscillator and having an output connected to a voltage regulator in order to output said supply voltage, comprising:

temporarily controlling said voltage at startup by means of a hysteresis comparator arranged to act, at a power-on of the circuit, on said oscillator; and controlling at steady-state a difference between said supply voltage and the voltage produced by said multiplier by means of an additional hysteresis comparator operative to modulate the operation of said oscillator.

11. A method according to claim 10, wherein said additional hysteresis comparator is cut off during operation of the active comparator at startup.

12. A method according to claim 10, wherein said hysteresis comparators control said oscillator through a logic circuit.

13. A method, comprising:

comparing an output voltage of a voltage regulator circuit to an input voltage of the voltage regulator circuit;

if, during the comparing step, the input voltage does not exceed the output voltage by more than a first margin, then turning on an oscillator, where an output of the oscillator is connected to an input of the voltage regulator circuit via a charge pump voltage multiplier circuit; and if, during the comparing step, the input voltage exceeds the output voltage by more than a second margin, then turning off the oscillator.

14. The method of claim 13 wherein the first and second margins are selectable according to a current load connected to an output of the voltage regulator circuit.

15. The method according to claim 13 wherein the comparing step is performed by a hysteresis comparator.

16. The method according to claim 13 wherein the comparing step is performed by first and second hysteresis comparators, the first comparator operating while the output voltage is less than a predetermined startup threshold, during which time the second comparator is disabled, the second comparator operating while the output voltage is greater than the predetermined startup threshold, during which time the first comparator is disabled.

17. A device comprising:

means for converting a low voltage to a high voltage;

means for receiving the high voltage and providing a regulated voltage at a level between the low voltage and the high voltage; and means for comparing the high voltage to the regulated voltage and turning off the converting means if the high voltage exceeds the regulated voltage by more than a first margin, and turning on the converting means if the high voltage does not exceed the regulated voltage by more than a second margin.

18. The device of claim 17 wherein the converting means comprises a charge pump booster.

19. The device of claim 17 wherein the means for receiving and converting comprises a voltage regulator circuit.

20. The device of claim 17 wherein the comparing means comprises a hysteresis comparator.

21. A battery powered device, comprising a power supply including:

a voltage multiplier circuit which is associated with an oscillator and having an output;

a voltage regulator having an input connected to the output of the voltage multiplier circuit and an output connected to a load; and a comparator circuit having first and second inputs connected to the output of the voltage multiplier circuit and the output of the voltage regulator circuit, respectively, and an output connected to a control terminal of the oscillator, the comparator circuit being configured to compare a first voltage level, at the output of the voltage multiplier circuit, to a second voltage level, at the output of the voltage regulator circuit, to turn on the oscillator if the first voltage level does not exceed the second voltage level by a first margin, and to turn off the oscillator if the first voltage level exceeds the second voltage level by more than a second margin.

* * * * *

UNITED STATES PATENT AND TRADEMARK OFFICE
CERTIFICATE OF CORRECTION

PATENT NO.    : 6,518,830 B2
DATED         : February 11, 2003
INVENTOR(S)   : Roberto Gariboldi et al.

It is certified that error appears in the above-identified patent and that said Letters Patent is hereby corrected as shown below:

Title page,
Item [73], Assignee, should read as -- STMicroelectronics S.r.I., Agrate Brianza, and Tecdis S.p.A., Chatillon (Aosta), both of Italy --.

Signed and Sealed this

Twenty-eighth Day of June, 2005

JON W. DUDAS
*Director of the United States Patent and Trademark Office*